(12) United States Patent  
O'Connor

(10) Patent No.: US 8,457,464 B2  
(45) Date of Patent: Jun. 4, 2013

(54) CABLE ENCLOSURE AND RADIUS-LIMITING CABLE GUIDE WITH INTEGRAL MAGNETIC DOOR CATCH

(75) Inventor: Douglas P. O'Connor, Richmond, RI (US)

(73) Assignee: Hubbell Incorporated, Shelton, CT (US)

( * ) Notice: Subject to any disclaimer, the term of this patent is extended or adjusted under 35 U.S.C. 154(b) by 91 days.

(21) Appl. No.: 13/245,228

(22) Filed: Sep. 26, 2011

(65) Prior Publication Data

US 2013/0077927 A1    Mar. 28, 2013

(51) Int. Cl.  
*G02B 6/00* (2006.01)

(52) U.S. Cl.  
USPC .......................................... 385/135; 385/134

(58) Field of Classification Search  
USPC ................... 385/100, 134, 135, 136, 137  
See application file for complete search history.

(56) References Cited

U.S. PATENT DOCUMENTS

| | | |
|---|---|---|
| 945,856 A | 1/1910 | Murray |
| 1,396,434 A | 11/1921 | Horton |
| 3,293,588 A | 12/1966 | Blonder |
| 3,654,663 A | 4/1972 | Algotsson |
| 4,083,618 A | 4/1978 | Busch |
| 4,630,886 A | 12/1986 | Lauriello |
| 4,708,430 A | 11/1987 | Donaldson |
| 4,731,501 A | 3/1988 | Clark et al. |
| 4,824,196 A | 4/1989 | Bylander |
| 4,971,421 A | 11/1990 | Ori |
| 5,052,773 A | 10/1991 | Noon |
| 5,067,784 A | 11/1991 | Debortoli et al. |
| 5,109,467 A | 4/1992 | Hogan et al. |
| 5,119,459 A | 6/1992 | Meyerhoefer et al. |
| 5,408,570 A | 4/1995 | Cook |
| 5,459,808 A | 10/1995 | Keith |
| 5,490,229 A | 2/1996 | Ghandeharizadeh et al. |
| 5,497,444 A | 3/1996 | Wheeler |

(Continued)

FOREIGN PATENT DOCUMENTS

| | | |
|---|---|---|
| EP | 0584444 | 3/1994 |
| EP | 0637767 | 2/1995 |

(Continued)

OTHER PUBLICATIONS

Hubbell Premise Wiring OPTIchannel FCR Rack Mount Fiber Panels, 2 pages, Oct. 2001.

(Continued)

*Primary Examiner* — Brian Healy  
(74) *Attorney, Agent, or Firm* — Alan I. Cantor; Mark S. Bicks; Alfred N. Goodman

(57) ABSTRACT

A door catch arrangement for cable enclosures incorporates magnetic catch components on the door and on an adjacent open-ended, flared, radius-limiting cable guide installed in at least one open-ended cable port of the enclosure. The cable guide itself covers the rim of the cable port and has two spaced legs, each leg having an end face disposed at the open end of the cable port. A recess in one of the end faces holds a magnet. In its closed position, the door blocks the end of the cable port and a ferromagnetic catch portion on the door opposes the magnet, which keeps the door closed. The positions of the magnet and the ferromagnetic catch portion can be reversed.

35 Claims, 7 Drawing Sheets

U.S. PATENT DOCUMENTS

| | | |
|---|---|---|
| 5,530,954 A | 6/1996 | Larson |
| 5,559,922 A | 9/1996 | Arnett |
| 5,613,030 A | 3/1997 | Hoffer et al. |
| 5,694,511 A | 12/1997 | Pimpinella et al. |
| 5,708,751 A | 1/1998 | Mattei |
| 5,737,475 A | 4/1998 | Regester |
| 5,778,130 A | 7/1998 | Walters et al. |
| 5,796,908 A | 8/1998 | Vicory |
| 5,806,140 A | 9/1998 | Carlson et al. |
| 5,825,962 A | 10/1998 | Walters et al. |
| 5,945,633 A | 8/1999 | Ott |
| 6,044,194 A | 3/2000 | Meyerhoefer |
| 6,236,798 B1 * | 5/2001 | Finzel et al. ............ 385/147 |
| 6,353,183 B1 | 3/2002 | Ott |
| 6,388,891 B1 | 5/2002 | Falkenberg |
| 6,445,865 B1 * | 9/2002 | Janus et al. ............ 385/135 |
| 6,498,293 B2 | 12/2002 | Marchand et al. |
| 6,510,274 B1 | 1/2003 | Wu et al. |
| 6,707,978 B2 | 3/2004 | Wakileh et al. |
| 6,708,918 B2 | 3/2004 | Ferris et al. |
| 6,866,541 B2 | 3/2005 | Barker et al. |
| 7,079,744 B2 | 7/2006 | Douglas et al. |
| 7,509,015 B2 | 3/2009 | Murano |
| 7,622,673 B2 | 11/2009 | Quijano |
| 7,715,681 B2 | 5/2010 | Krampotich et al. |
| 7,764,859 B2 | 7/2010 | Krampotich et al. |
| 7,843,698 B2 | 11/2010 | Takizawa et al. |
| 2002/0191941 A1 * | 12/2002 | Milanowski et al. ......... 385/135 |
| 2010/0296789 A1 | 11/2010 | Womack et al. |
| 2010/0329620 A1 * | 12/2010 | Griffiths et al. ............ 385/135 |
| 2011/0097051 A1 * | 4/2011 | Vermeulen et al. ........... 385/135 |

FOREIGN PATENT DOCUMENTS

| | | |
|---|---|---|
| JP | 3040707 | 2/1991 |
| JP | 4125503 | 4/1992 |
| JP | 6034825 | 2/1994 |
| JP | 7159626 | 6/1995 |

OTHER PUBLICATIONS

Optical Cable FiberOpticX Dwg. No. C101400 Rack Mount Ass'y RTC18, 1 page, Oct. 26, 2004.

Leviton Opt-X Ultra Rack Mount Fiber Termination and Splice Enclosures, 16 pages, 2008.

\* cited by examiner

CABLE ENCLOSURE AND RADIUS-LIMITING CABLE GUIDE WITH INTEGRAL MAGNETIC DOOR CATCH

FIELD OF THE INVENTION

The invention relates to enclosures, in particular, to enclosures for terminating and interconnecting signal carrying cables, such as fiber optic cables.

BACKGROUND OF THE INVENTION

Many cable enclosures are designed for rack mounting and have an interior cavity with an intermediate bulkhead, which supports a plurality of connectors. The bulkhead also divides the cavity into front and rear compartments, which may be closed by respective front and rear doors that are removable and/or hinged to the enclosure, and are held closed by a mechanical catch or a lock. The side walls of the enclosure adjacent the front and/or the rear compartments typically are provided with cable ports, which may be open-ended. The open-ended feature facilitates cable routing, and the adjacent door typically closes off the open ends of the cable ports to confine the cables in the ports. Examples of these types of enclosures are disclosed in U.S. Pat. No. 5,459,808 to Keith; U.S. Pat. No. 6,353,183 to Ott, et al.; U.S. Pat. No. 5,737,475 to Regester; and U.S. Pat. No. 4,630,886 to Lauriello, et al. Flared, radius-limiting cable guides in the cable ports prevent cable damage. See, for example, U.S. Pat. No. 6,388,891 to Falkenberg, et al. and U.S. Pat. No. 7,079,744 to Douglas, et al.

SUMMARY OF THE INVENTION

According to the invention, a simpler and more cost-effective door catch arrangement for cable enclosures incorporates magnetic catch components on the door and on at least one adjacent open-ended, flared, radius-limiting cable guide installed in an open-ended cable port of the enclosure.

The cable guide itself comprises a body having a first leg, a second leg and a bight portion joining proximal portions of the legs, each of the legs having a distal end face directed away from the bight portion. A substantially continuous flared shoulder extends along the legs and the bight portion on one side of the body. The distal end face of one or each leg has a recess. A magnet or a ferromagnetic catch member can be retained in either recess.

The cable guide may be substantially symmetrical about a medial plane bisecting the bight portion and substantially perpendicular to the side of the body. The cable guide preferably has an outer peripheral groove in the legs and in the bight portion that facilitates mounting of the cable guide in an open-ended cable port of an enclosure. A retention member extends from the bight portion in a direction opposite the legs and has a lateral retention tab or recess adapted to engage a mating feature on the enclosure wall.

The cable enclosure system according to the invention comprises a housing having a plurality of walls defining a cavity. Front edges of at least some of the walls define a front opening providing access to the cavity. A cable port adjacent the front opening extends through at least one of the walls that define the front opening (hereinafter a "ported wall"). The cable port is defined by a rim intersecting the front edge of the ported wall at two spaced locations to define an open end of the cable port at the front edge of the ported wall. A flared radius-limiting cable guide is mounted around the rim of the cable port and terminates in first and second spaced front portions defining therebetween a front cable opening into the cable port. A door is movable between an open position and a closed position in which the door substantially closes the front access opening and the front cable opening and opposes at least the first front portion of the cable guide. A magnet holds the door closed by attracting a ferromagnetic catch portion. Preferably, the magnet is supported by the first front portion of the cable guide and the ferromagnetic catch portion is supported by the portion of the door that opposes that front portion of the cable guide. The positions of the magnet and the ferromagnetic catch portion may be reversed.

The housing walls may include a bottom wall (which may include a sliding tray), an opposing top wall and opposing side walls extending between the bottom wall and the top wall, the front edges of those walls defining the front access opening. The housing may have a cable port through each side wall and a cable guide in each cable port; and the door may be hinged at its bottom edge for pivotal movement between a lowered open position and a raised closed position in which it substantially closes the front access opening and both front cable openings. In that configuration, the upper front portion of each cable guide preferably holds a magnet, preferably in a recess. The door correspondingly has ferromagnetic catch portions that oppose and are held by respective magnets when the door is closed.

BRIEF DESCRIPTION OF THE DRAWINGS

Preferred embodiments of the disclosed invention, including the best mode for carrying out the invention, are described in detail below, purely by way of example, with reference to the accompanying drawing, in which.

DETAILED DESCRIPTION OF THE INVENTION

As used in this application, terms such as "front," "rear," "side," "top," "bottom," "above," "below," "upwardly" and "downwardly" are intended to facilitate the description of the invention and its components, and are not intended to limit the structure of the invention or its components to any particular position or orientation. While the enclosure of the invention is designed for routing, interconnecting and storing fiber optic cables, it is also suitable for managing electrical cables.

Figure 1:
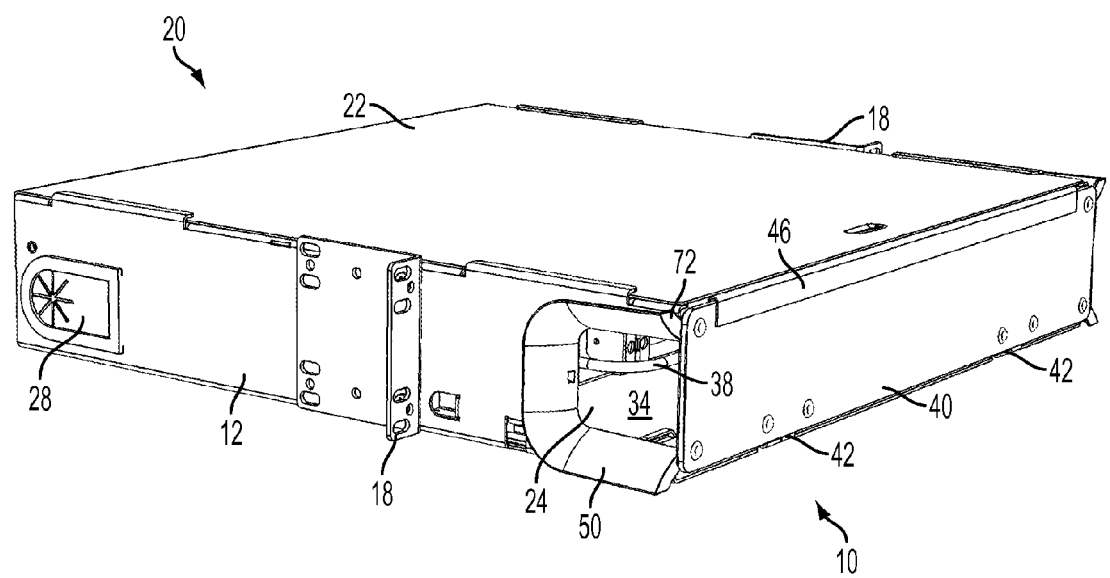
FIG. 1 is a perspective view of a preferred embodiment of the cable enclosure system of the invention.
Figure 2:
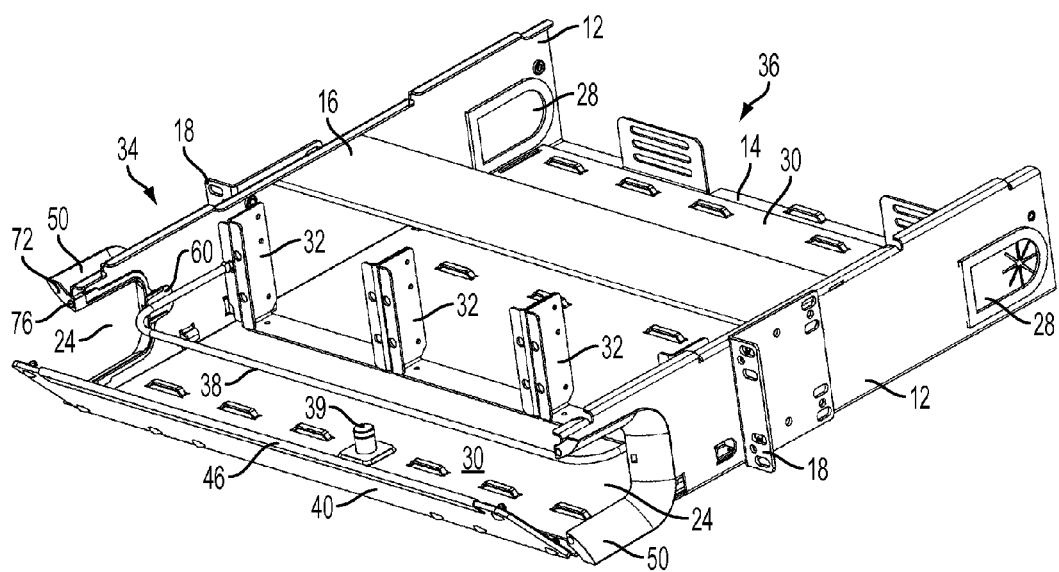
FIG. 2 is a perspective view thereof from a different angle with the top/rear cover removed and the front door partially open.
Figure 3:
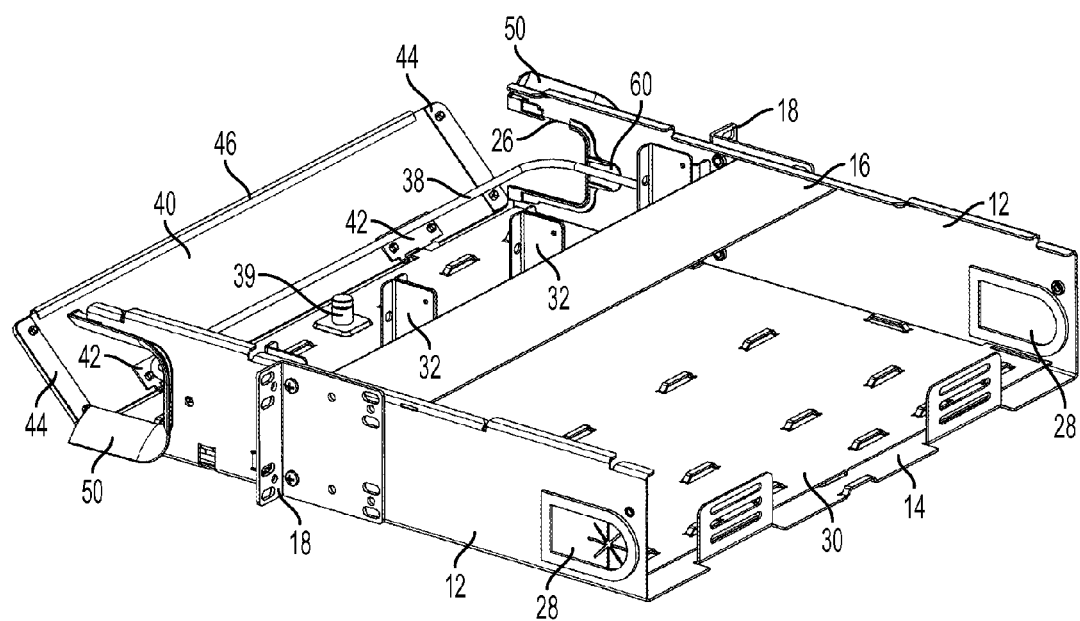
FIG. 3 is a perspective view thereof from yet another angle with the top/rear cover removed and the front door partially open.
Figure 4:
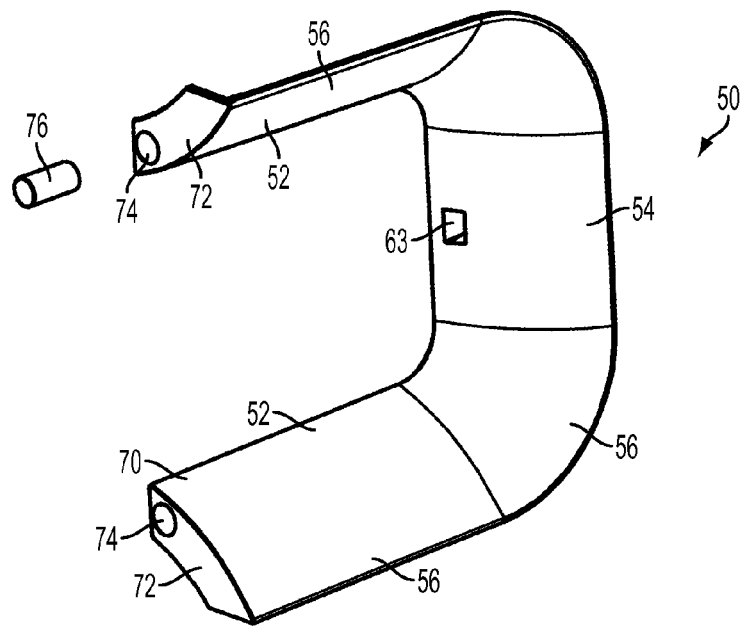
FIG. 4 is an exploded perspective view of the cable guide of the invention shown on the right side of FIG. 2.
Figure 5:
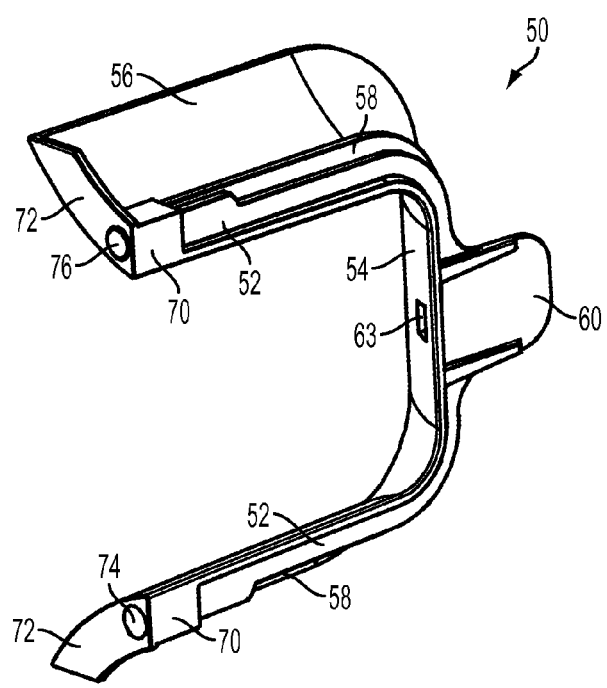
FIG. 5 is an assembled perspective of the cable guide of the invention shown on the left side of FIG. 2.

Referring to FIGS. 1-3, an exemplary cable enclosure according to the invention has a generally rectangular metal housing enclosing a cavity and comprising a base portion 10 and a top cover portion 20. Base portion 10 comprises two upstanding side walls 12 joined to a bottom wall 14, and a top brace 16 interconnecting the tops of side walls 14. An L-shaped bracket 18 on the exterior of each side wall 12 facilitates mounting of the enclosure to a rack. Top cover portion 20 is L-shaped and comprises a top wall 22 joined to a depending rear wall (not shown). Top cover portion 20 is supported and retained by in-turned flanges at the tops of side walls 12, and can be removed by sliding it rearward. A latch and/or lock (not shown) holds top cover portion 20 in the closed position shown in FIG. 1. A cable port 24 at the front end of each side wall 12 is defined by a U-shaped rim 26 (see FIG. 3, cutaway portion), which intersects the front edge of the side wall. Rim 26 supports a flared, U-shaped, radius-limiting cable guide 50, described below. Cable access to the rear of the housing is afforded through side wall ports temporarily closed by conventional rubber grommets 28.

A tray 30 is slidably supported above bottom wall 14 in a manner similar to that disclosed in U.S. Pat. No. 6,498,293 to Marchand, et al., which is incorporated herein by reference in its entirety. Tray 30 supports a bulkhead bracket assembly 32, which divides the cavity into a front and rear compartments 34, 36 and is adapted to support devices such as connector-bearing "cards" (not shown) that interface with the cables. The front compartment 34 is readily accessible for making connections to cables entering the front compartment through front cable ports 24, while the rear compartment 36 can be used for making connections to cables entering from the rear and for storing excess cable. A cable manager bar 38 is supported by bulkhead assembly 32 in front compartment 34. A conventional tray latch 39 engages bottom wall 14 to fix tray 30 within the housing. Tray 30 can be slid forward, if necessary, by lifting latch 39 to disengage it from the bottom wall.

A front door 40 is hinged at 42 along its bottom edge to the front of tray 30. If the enclosure does not have a sliding tray, front door 40 would be hinged to bottom wall 14. When in the raised position shown in FIG. 1, door 40 closes the front opening defined by the front edges of side walls 12, top wall 22 and tray 30 (and/or bottom wall 14), including the front openings of cable ports 24. Door 40 preferably comprises a translucent or transparent thermoplastic panel 42, which permits viewing of the cable connections in front compartment 34 when the door is closed. Hinge plates 42 preferably are riveted to door 40 and are of a conventional type that permits door removal through disengagement of the hinge halves by movement of the open door along the hinge axis. Other types of hinges may be used (separable or inseparable), or the bottom edge of the door may be held in place behind prong-like abutments formed on tray 30 (or on bottom wall 14), such as disclosed in U.S. Pat. No. 5,459,808 to Keith (incorporated herein by reference in its entirety). Riveted to the inner face of the door at each end thereof is a ferromagnetic catch member in the form of a thin steel plate 44. If the door is made of steel, separate steel "catch" plates would not be required because the door steel itself would be attracted by the magnets described below. The top edge of the door may carry a label holder 46.

Referring to FIGS. 4-8, the cable guide 50 has a generally U-shaped body, preferably molded of thermoplastic material, having two legs 52 joined by a bight portion 54. Legs 52 are substantially straight and parallel, and the center of bight portion 54 is substantially straight and perpendicular to the legs 52. A substantially continuous flared shoulder 56 extends along legs 52 and bight portion 54 along one side of the body. A peripheral mounting groove 58 extends around the outside of legs 52 and bight portion 54, and is sized to embrace the similarly shaped rim 26 of a cable port 24. Other means could be employed to engage rim 26. For example, the cable guide could have an integral, substantially continuous lip or flange on one side and integral flexible latch tabs on the other side, such as disclosed in U.S. Pat. No. 6,353,183 to Ott, et al. (incorporated herein by reference in its entirety).

Figure 6:
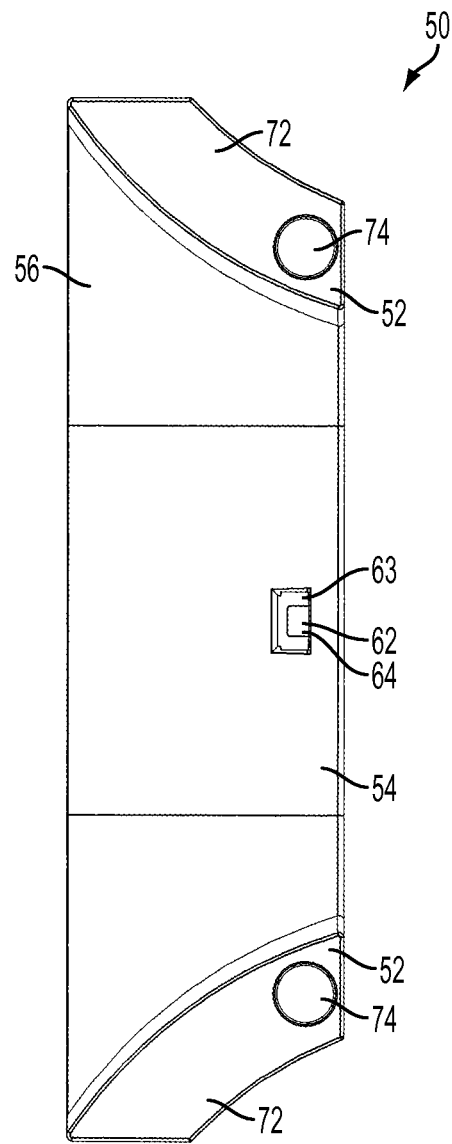
FIG. 6 is a front elevational view of the cable guide of the invention.
Figure 7:
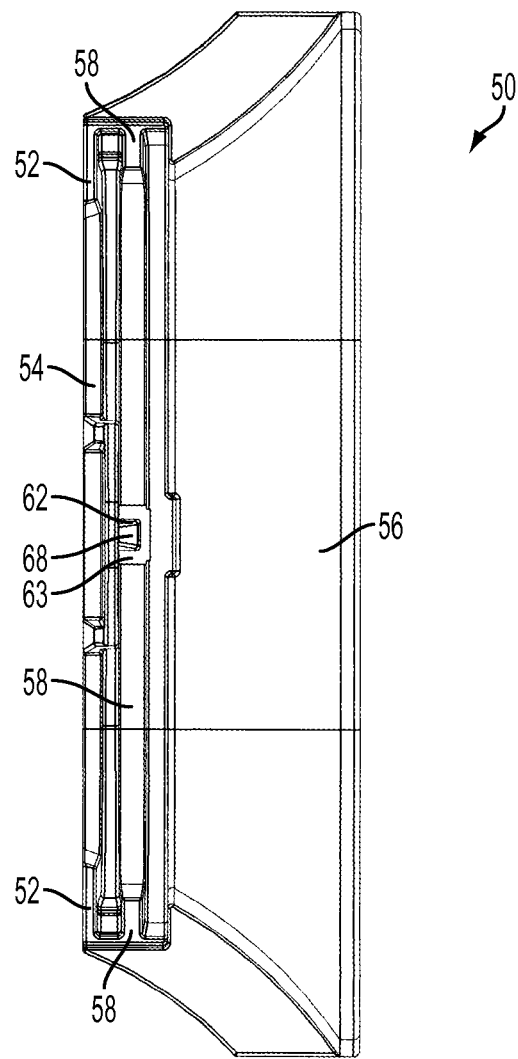
FIG. 7 is a rear elevational view thereof.
Figure 8:
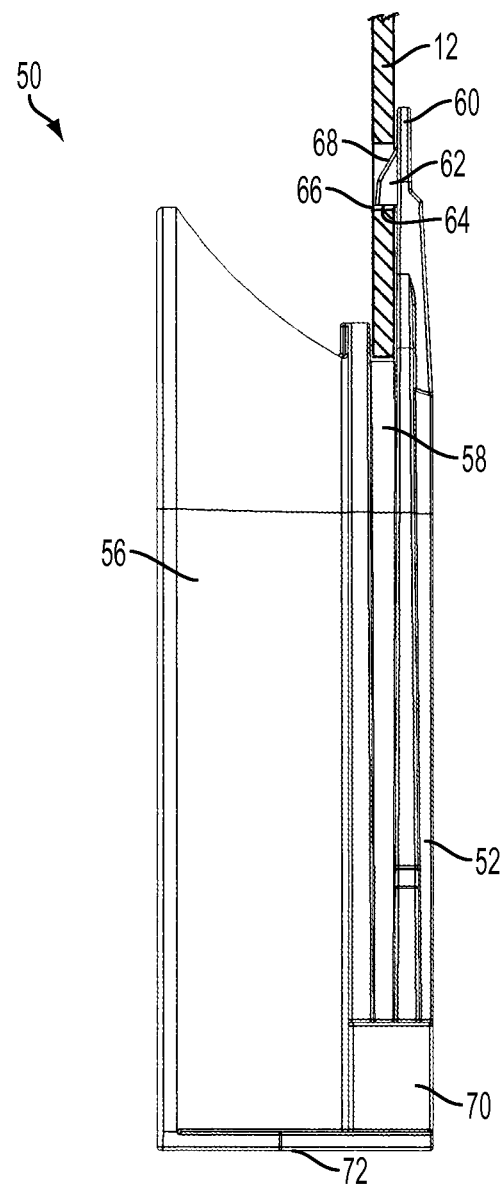
FIG. 8 is a top or bottom plan view thereof, which also shows a mating portion of the enclosure side wall in cross-section.

A retention member 60 extends rearward from bight portion 54 and has a retention tab 62 (see FIGS. 6-8) projecting laterally toward the flared shoulder 56. As seen in FIG. 6 (through an aperture 63) and in FIG. 8, retention tab 62 has a forward-facing shoulder 64 adapted to engage the inner edge of a hole or notch 66 in side wall 12. Installation of cable guide 50 simply involves sliding it into the open end of a cable port 24 with the cable port rim 26 in groove 58 of the cable guide. Retention member 60 deflects laterally away from side wall 12 when the ramped leading edge 68 of retention tab 62 (see FIGS. 7 and 8) encounters the rear portion of rim 26, and then snaps back flat against side wall 12 when tab 62 engages hole or notch 66 in side wall 12. In an alternate embodiment, the retention tab could be formed on side wall 12 and the mating hole or notch could be formed on retention member 60.

Each leg 52 of cable guide 50 terminates in a front portion 70 having a distal end face 72 in which a cylindrical recess 74 is formed. A cylindrical magnet 76 is retained in one of the recesses 74, depending on the location of the cable port. In the embodiment illustrated, that recess is the one farther from the hinged edge of front door 40. When the door is closed as seen in FIG. 1, each steel plate 44 opposes the distal end face 72 of each leg 52. The opposing magnet 76 attracts steel plate 44 to keep the door closed. Magnet 76 and recess 74 preferably are sized such that a force fit retains the magnet in the recess. Alternatively, or in addition, an adhesive may be used to retain the magnet. The magnet alternatively could take the form of a small rectangular plate adhesively mounted in a complementary shallow recess on distal end face 72. In alternate embodiments, the positions of the magnet and the ferromagnetic catch portion could be reversed. For example, a small planar magnet could be adhesively mounted on the door, and a small, thin steel member could be adhesively mounted in a complementary shallow recess on a distal end face 72 of the cable guide.

The illustrated cable guide 50 is symmetrical about a medial plane that bisects bight portion 54 and is perpendicular to the sides of the body. This symmetry enables the cable guide to be used in any open-ended cable port that is closed by a door. For added holding force, a magnet could be installed in each of the two recesses 74, but a single magnet usually will suffice. That magnet typically is installed in the recess located farther from the hinged edge of the door. If the cable guide is installed in a location such that both recesses 74 are the same distance from the hinged edge of the door (such as in a top wall above a bottom-hinged door, or in a side wall across from a side-hinged door), the magnet location would be the one closer to the steel portion of the door when closed, or arbitrary if the steel portion is sufficiently large to cover both recesses when the door is closed.

The symmetrical, generally U-shaped configuration of the illustrated cable guide is merely exemplary. The shape of the cable guide body typically is determined by the shape of the open-ended housing cable port in which it will be installed. The body usually will have two legs joined by a bight portion, a cable opening defined by the distal ends of the legs, and a recess in the distal end face of at least one leg in which a magnet or a ferromagnetic catch portion is retained. The legs and/or the bight portion need not be straight. For example, a cable guide intended to line the rim of a rounded or C-shaped cable port would have curved legs that diverge from a curved bight portion and then converge toward their spaced distal ends. If such a cable guide has a peripheral mounting groove, its installation would involve squeezing the resilient legs together far enough to permit insertion of the cable guide into the cable port from the outer face of the housing wall. The use of flexible latch tabs referred to above would make installation of such a cable guide easier (see U.S. Pat. No. 6,353,183 to Ott, et al.). The basic principles of the invention also apply regardless of the aspect ratio of the cable guide and the cable port into which it fits (taller, shorter, deeper or shallower than that illustrated). Furthermore, the shape of the flared shoulder is not limited to that shown in the figures. Any shoulder profile would suffice as long as it prevents damaging sharp bends in cables passing through the cable port.

Various embodiments have been chosen to illustrate the invention, and it will be understood by those skilled in the art that various changes and modifications may be made without departing from the scope of the invention as defined by the appended claims.

What is claimed is:

1. A cable enclosure system, comprising:
   a housing including a bottom wall, an opposing top wall and opposing side walls extending between said bottom wall and said top wall, the housing enclosing a cavity having a front access opening defined by front edges of said bottom wall, said top wall and said side walls;
   a cable port through each of said side walls adjacent said front access opening, each of said cable ports defined by a rim intersecting the front edge of the respective side wall at two spaced locations to define an open end of the cable port at said front edge of said side wall;
   a flared radius-limiting cable guide mounted around the rim of each of said cable ports and terminating in spaced upper and lower front portions defining therebetween a front cable opening into the respective cable port;
   a magnet supported by said upper front portion of each of said cable guides at a front face thereof; and
   a door hinged at its bottom to said housing at said front access opening for pivotal movement between a lowered open position and a raised closed position in which said door substantially closes said front access opening and said front cable openings, said door having a ferromagnetic catch portion at each lateral end thereof that opposes a respective magnet when the door is closed, said magnets keeping the door in the closed position.

2. The cable enclosure system of claim 1, wherein said upper front portion of each of said cable guides has a forward-facing recess therein, and said magnet is retained in said recess.

3. The cable enclosure system of claim 2, wherein said lower front portion of each of said cable guides has a forward-facing recess.

4. The cable enclosure system of claim 3, wherein each of said cable guides is substantially symmetrical about a laterally extending medial plane between its upper and lower front portions.

5. The cable enclosure system of claim 4, wherein each of said cable guides is a generally U-shaped member comprising upper and lower substantially parallel legs and a bight portion joining proximal portions of said legs, said upper and lower legs distally terminating respectively in said upper and lower front portions.

6. The cable enclosure system of claim 5, wherein each of said cable guides has an outer peripheral groove in said bight portion and in said upper and lower legs, said peripheral groove engaging the rim of the respective cable port.

7. The cable enclosure system of claim 6, wherein said bight portion includes a retention member that extends rearward and has a laterally protruding tab retained in a recess in the respective side wall.

8. The cable enclosure system of claim 1, wherein each of said cable guides has an outer peripheral groove that engages the rim of the respective cable port.

9. The cable enclosure system of claim 8, wherein each of said cable guides includes a retention member that extends rearward and has a forward-facing retention surface disposed behind a rearward-facing retention surface on the respective side wall.

10. The cable enclosure system of claim 1, wherein said door comprises a thermoplastic panel and each of said ferromagnetic catch portions comprises a steel plate attached to said thermoplastic panel.

11. The cable enclosure system of claim 1, wherein said door comprises a steel panel and each of said ferromagnetic catch portions comprises an end portion of said steel panel.

12. A cable enclosure system, comprising:
   a housing including a bottom wall, an opposing top wall and opposing side walls extending between said bottom wall and said top wall, the housing enclosing a cavity having a front access opening defined by front edges of said bottom wall, said top wall said side walls;
   a cable port adjacent said front access opening through at least one of said walls, thus forming a ported wall, said cable port defined by a rim intersecting said front edge of said ported wall at two spaced locations to define an open end of the cable port at said front edge of said ported wall;
   a flared radius-limiting cable guide mounted around the rim of said cable port and terminating in first and second spaced front portions defining therebetween a front cable opening into said cable port;
   a magnet supported by one of said front portions of said cable guide at a front face thereof; and
   a door pivotable between an open position providing access to said cavity and a closed position in which said door substantially closes said front access opening and said front cable opening, said door having a ferromagnetic catch portion that opposes said magnet when the door is closed, said magnet keeping the door in the closed position.

13. The cable enclosure system of claim 12, wherein said first portion of said cable guide has a forward-facing recess therein, and said magnet is retained in said recess.

14. The cable enclosure system of claim 13, wherein said second front portion of said cable guide has a forward-facing recess therein.

15. The cable enclosure system of claim 14, wherein said cable guide is substantially symmetrical about a medial plane perpendicular to the plane of said cable port.

16. The cable enclosure system of claim 15, wherein said cable guide comprises first and second spaced legs and a bight portion joining proximal portions of said legs, said first and second legs distally terminating respectively in said first and second front portions.

17. The cable enclosure system of claim 16, wherein said cable guide has an outer peripheral groove in said bight portion and in said first and second legs, said peripheral groove engaging the rim of the cable port.

18. The cable enclosure system of claim 17, wherein said bight portion includes a retention member that extends rearward and has a protruding tab retained in a recess in the ported wall.

19. The cable enclosure system of claim 12, wherein said cable guide has an outer peripheral groove that engages the rim of the cable port.

20. The cable enclosure system of claim 19, wherein said cable guide includes a retention member that extends rearward and has a forward-facing retention surface disposed behind a rearward-facing retention surface on the ported wall.

21. The cable enclosure system of claim 12, wherein said door comprises a thermoplastic panel and said ferromagnetic catch portion comprises a steel plate attached to said thermoplastic panel.

22. The cable enclosure system of claim 12, wherein said door comprises a steel panel and said ferromagnetic catch portion comprises a portion of said steel panel.

23. The cable enclosure system of claim 12, wherein the door is hinged at said front access opening to a housing portion other than said ported wall.

24. A cable enclosure system, comprising:
- a housing having a plurality of walls defining a cavity, front edges of at least some of said walls defining a front opening providing access to said cavity;
- a cable port adjacent said front opening through at least one of said walls whose front edges define said front opening, thus forming a ported wall, said cable port defined by a rim intersecting the front edge of said ported wall at two spaced locations to define an open end of the cable port at said front edge of said ported wall;
- a flared radius-limiting cable guide mounted around the rim of said cable port and terminating in first and second spaced front portions defining therebetween a front cable opening into said cable port;
- a door movable between an open position and a closed position in which said door substantially closes said front access opening and said front cable opening and opposes at least said first front portion of said cable guide;
- a magnet supported by one of said first front portion of said cable guide and a portion of the door that opposes said first front portion of said cable guide; and
- a ferromagnetic catch portion supported by the other of said first front portion of said cable guide and said portion of the door that opposes said first front portion of said cable guide.

25. The cable enclosure system of claim 24, wherein said first front portion of said cable guide has a forward-facing recess therein, and said magnet is retained in said recess.

26. The cable enclosure system of claim 25, wherein said second front portion of said cable guide has a forward-facing recess therein similar to the forward-facing recess in said first front portion of said cable guide.

27. The cable enclosure system of claim 24, wherein said door is hinged at said front access opening to a housing portion other than said ported wall.

28. A radius-limiting cable guide adapted for installation in an open-ended cable port of a cable enclosure, the cable guide comprising:
- a body having a first leg, a second leg and a bight portion joining proximal portions of said legs, each of said legs having a distal end face directed away from said bight portion;
- a substantially continuous flared shoulder extending along said legs and said bight portion on one side of the body; and
- a recess in the distal end face of at least one of said legs.

29. The radius-limiting cable guide of claim 28, comprising a recess in the distal end face of each of said legs.

30. The radius-limiting cable guide of claim 29, wherein the cable guide is substantially symmetrical about a medial plane that bisects said bight portion and is substantially perpendicular to said one side of said body.

31. The radius-limiting cable guide of claim 30, further comprising a magnet retained in one of said recesses.

32. The radius-limiting cable guide of claim 28, further comprising a magnet retained in said recess.

33. The radius-limiting cable guide of claim 32, further comprising an outer peripheral groove in said legs and in said bight portion.

34. The radius-limiting cable guide of claim 33, wherein said bight portion includes a retention member extending therefrom in a direction opposite said legs, said retention member having a retention surface facing toward said legs.

35. The radius-limiting cable guide of claim 34, wherein said retention surface is on a tab protruding laterally toward said flared shoulder.

\* \* \* \* \*